Patented Dec. 10, 1929

1,738,967

UNITED STATES PATENT OFFICE

SAMUEL S. SADTLER, OF PHILADELPHIA, PENNSYLVANIA

POWDERED DETERGENT

No Drawing.    Application filed December 10, 1927.    Serial No. 239,264.

My invention relates to the preparation of a detergent composition which is practically neutral in reaction even after being mixed with water. It is well known that even neutral soaps dissociate with water in the formation of solutions and suspensions of alkaline intensity.

This preparation is designed especially for washing surfaces that would tend to be injured by solutions of appreciable alkaline intensity. I have reference to washing painted and varnished surfaces.

It is also valuable for use as a "mechanic soap", or detergent for the use of mechanics, and others who have very greasy hands.

I have succeeded in making a composition which has satisfactory cleansing properties and meets the conditions referred to with regard to neutrality. The principle upon which this is based is the fact that bentonite and similar natural occurring silicates produce a condition of low surface tension with water, and act as detergents, but bentonite taken alone is difficult to use on account of the fact that it swells so rapidly with water that forms a jelly and does not suspend itself readily in water and become dissipated with rinsing.

I have found that infusorial or diatomaceous earth acts satisfactorily, as a mechanical absorbent of the wet bentonite which would otherwise be very sticky and hard to use. Furthermore, infusorial earth acts as a mild abrasive which is useful both for cleaning painted surfaces and for use as a detergent for removing grease from hands.

For most purposes, I do not add anything to this preparation. It may be pressed into cakes with the addition of a very little water, enough to cause a temporary gelatinization of the bentonite, which is then dried, but I may add a small amount of sulphonated oil of a neutral type, such as one partly neutralized with ammonia. This has a hydrogen ion value (pH) with water of approximately 7.0. I prefer to use a neutralized sulphonated fatty oil, preferably neutralized sulphonated castor oil, or neutralized sulphonated olive oil.

I have made successful preparations of this kind, using about three parts of bentonite to one of infusorial earth, and have increased the infusorial earth until it is about twice the weight of the bentonite taken; and for various purposes different mixtures might be used, the main principle being, however, that sufficient infusorial earth is used to first take up bentonite and prevent too dense or glutinous jelly being formed when wet.

A formula that is adaptable to either use as powder or cake, and preferred by me, is as follows:—

|  | Parts by weight |
|---|---|
| Bentonite | 60 |
| Infusorial earth | 40 |
| Sulphonated oil | 5½ |
| Water | 15 |

The sulphonated oil is dissolved in the water, and preferably first mixed with the infusorial earth to dampen it, and then the bentonite stirred in. The use of the water is largely to effect a distribution of the sulphonated oil, but if the preparation is to be pressed into a cake, it can be pressed while still damp. In the production of a powder, it is preferable to dry before disintegrating any loose lumps in the powder.

Claims:—

1. A detergent composed of bentonite, infusorial earth and sulphonated oil, said infusorial earth moistened with said oil, and the particles of said moistened earth being coated with said bentonite.

2. A detergent composed of bentonite, 30 to 75 parts by weight; infusorial earth, 25 to 65 parts by weight; and, sulphonated oil, approximately 5 parts by weight, said infusorial earth moistened with said oil, and the particles of said moistened earth being coated with said bentonite.

3. The method of supporting and retaining a coating of bentonite upon the surfaces of the particles of a non-gelatinous powder, which comprises wetting said powder with a gelatinizing agent, and thoroughly mixing said wet powder with said bentonite.

In testimony whereof I affix my signature.

SAMUEL S. SADTLER.